US010922722B2

(12) United States Patent
Cetintas et al.

(10) Patent No.: US 10,922,722 B2
(45) Date of Patent: Feb. 16, 2021

(54) SYSTEM AND METHOD FOR CONTEXTUAL VIDEO ADVERTISEMENT SERVING IN GUARANTEED DISPLAY ADVERTISING

(71) Applicant: Yahoo Holdings, Inc., Sunnyvale, CA (US)

(72) Inventors: Suleyman Cetintas, Santa Clara, CA (US); Srinath Ravindran, Tamil Nadu (IN); Mohammad Saberian, Sunnyvale, CA (US); Sandeep Soni, Ahmednagar Maharashtra (IN); Kuang-chih Lee, Union City, CA (US); Hong Yao, Fremont, CA (US); Jian Yang, Palo Alto, CA (US); Pradhan Pattanayak, San Jose, CA (US)

(73) Assignee: Verizon Media Inc., New York, NY (US)

(*) Notice: Subject to any disclaimer, the term of this patent is extended or adjusted under 35 U.S.C. 154(b) by 1067 days.

(21) Appl. No.: 14/815,334

(22) Filed: Jul. 31, 2015

(65) Prior Publication Data
US 2017/0032424 A1    Feb. 2, 2017

(51) Int. Cl.
    *G06Q 30/02* (2012.01)
(52) U.S. Cl.
    CPC ..... *G06Q 30/0269* (2013.01); *G06Q 30/0277* (2013.01)
(58) Field of Classification Search
    CPC .................. G06Q 30/0269; G06Q 30/0277
    See application file for complete search history.

(56) References Cited

U.S. PATENT DOCUMENTS

| 2008/0319844 | A1* | 12/2008 | Hua | G06Q 30/02 |
| | | | | 705/14.73 |
| 2009/0282016 | A1* | 11/2009 | Gabrilovich | G06F 16/951 |
| 2013/0024286 | A1* | 1/2013 | Envarli | G06Q 30/02 |
| | | | | 705/14.61 |
| 2013/0073382 | A1* | 3/2013 | Henkin | G06F 16/955 |
| | | | | 705/14.49 |

OTHER PUBLICATIONS

"Private-By-Design Advertising and Analytics: From Theory to Practice", by Alexey Reznichenko. Max Planck Institute for Software Systems (MPI-SWS). Technical Report MPI-SWS-2014-005. Jun. 16, 2014. (Year: 2014).*

* cited by examiner

Primary Examiner — William A Brandenburg
(74) Attorney, Agent, or Firm — Cooper Legal Group, LLC (57) ABSTRACT

The technologies described herein serve contextually relevant advertisements under a guaranteed advertisement campaign. A publisher retrieves a guaranteed advertisement campaign related to a webpage available for serving an advertisement, and identifies a set of advertisements relating to the guaranteed advertisement campaign. Advertisement selecting circuitry of the publisher determines whether an advertisement that is contextually relevant to content published at the webpage is present in the set of advertisements. If there is no contextually relevant advertisement in the set of advertisements, the advertisement selecting circuitry selects an alternative advertisement from the set of advertisements that minimizes an under-delivery risk related to the guaranteed advertisement campaign. If there is a contextually relevant advertisement in the set of advertisements, the advertisement selecting circuitry selects the contextually relevant advertisement. Then, the publisher provides the selected advertisement to a client device.

20 Claims, 7 Drawing Sheets

SYSTEM AND METHOD FOR CONTEXTUAL VIDEO ADVERTISEMENT SERVING IN GUARANTEED DISPLAY ADVERTISING

BACKGROUND

This application relates to a method for serving advertisement in guaranteed display advertising system, more particularly, serving advertisements contextually relevant to content on a webpage in a guaranteed display advertising system.

In online advertising system, video advertisements are sold on a cost per impressions (CPM) or cost per complete view (CPCV) basis. Complete view means that users should watch a video until it ends. Although CPM campaigns deal with the impression goal, advertisers still expect a certain degree of completion rate as well as click rate. Advertisers are more willing to place their advertisements if CPCV or click-through rate (CTR) metric is higher. Therefore, in advertising system, it is important to have a certain degree of user engagement with advertisements. In order to induce user engagement, the video advertisements provided to users should be closely relevant to the content that users are watching or interested with.

However, it is difficult to serve always closely related video advertisements to content that users are watching because content is published every day online and the number of video advertisements is limited. And, if the publisher tries to serve only closely related video advertisements, there is a risk of under-delivery of advertisements associated with a guaranteed advertisement campaign.

Advertisers often run their advertisements as "advertisement campaigns" in which certain products or services are advertised over a duration (e.g., a week or a month or until a certain time) and targeted towards certain users. The guaranteed advertisement campaign guarantees a delivery of advertisements according to the terms in the campaign, for example, 1,000,000 impressions over a period of one month.

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale; emphasis instead is being placed upon illustrating the principles of the system. In the drawings, like referenced numerals designate corresponding parts throughout the different views.

DETAILED DESCRIPTION

Subject matter will now be described more fully hereinafter with reference to the accompanying drawings, which form a part hereof, and which show, by way of illustration, specific examples. Subject matter may, however, be embodied in a variety of different forms and, therefore, covered or claimed subject matter is intended to be construed as not being limited to examples set forth herein; examples are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

OVERVIEW

One of the technical problems solved by the disclosure is to serve contextually relevant video advertisements to a client device while minimizing a risk of under-delivery with a guaranteed advertisement campaign. Different from conventional solutions, the disclosed system solves the above problem by using evolutionary explorations.

The present disclosure describes serving video advertisements contextually relevant to video content that users are watching. Contextual relevancy will make the users much more likely to engage with the video advertisement, for example clicking the video advertisements, and viewing the advertisement completely. The present disclosure not only improves user engagement through long term user-satisfaction but also increases both publishers' and advertisers' revenue through improved metrics such as CPCV and CTR.

In a first aspect, a publisher retrieves a guaranteed advertisement campaign related to a webpage available for serving an advertisement, and identifies a set of advertisements relating to the guaranteed advertisement campaign. An advertisement selecting circuitry of the publisher determines whether an advertisement contextually relevant to content published at the webpage is present in the set of advertisements. If there is no contextually relevant advertisement in the set of advertisements, the advertisement selecting circuitry selects an alternative advertisement from the set of advertisements that minimizes an under-delivery risk related to the guaranteed advertisement campaign. If there is a contextually relevant advertisement in the set of advertisements, the advertisement selecting circuitry selects the contextually relevant advertisement. Then, the publisher provides the selected advertisement to a client device.

In a second aspect, a server includes a campaign matching circuitry, an advertisement matching circuitry, and an optimizing circuitry. The campaign matching circuitry selects a guaranteed advertisement campaign related to a webpage available for serving an advertisement and collects a set of advertisements relating to the guaranteed advertisement campaign. The advertisement matching circuitry identifies a contextually relevant advertisement based on a similarity score of each of the advertisements. The contextually relevant advertisement is relevant to content to be published on the webpage. The optimizing circuitry determines whether a contextually relevant advertisement is present in the set of advertisements. In response to the contextually relevant advertisement not being present, the optimizing circuitry selects an alternative advertisement from the set of advertisements that minimizes an under-delivery risk related to the guaranteed advertisement campaign. In response to the contextually relevant advertisement being present, the optimizing circuitry selects the contextually relevant advertisement. The optimizing circuitry provides the selected advertisement to a client device.

In a third aspect, whether an advertisement is contextually relevant to content is determined based on a similarity score between the advertisement and the content. An advertisement matching circuitry of the publisher extracts metadata of the content and a landing page of an advertisement, calculating a first score by comparing the metadata and the landing page. Also, the advertisement matching circuitry of the publisher samples the content and the advertisement, and extracts visual features from the sampled content and the sampled advertisement. Based on the extracted visual features the advertisement matching circuitry calculates a second score based on the extracted visual features. The advertisement matching circuitry obtains the similarity score based on the first and second scores.

The present disclosure is able to guarantee serving video advertisement impressions because even when the publisher is unable to find an advertisement contextually relevant to content on a webpage, an optimization process provides an alternative advertisement that minimizes a risk of under-delivery. Thus, the present disclosure enables the publisher to serve contextually relevant advertisements without harming the guaranteed advertisement campaign.

DETAILED DESCRIPTION OF THE DRAWINGS

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so-called 'virtual persons.' An individual's social network may be represented in a variety of forms, such as visually, electronically or functionally. For example, a "social graph" or "socio-gram" may represent an entity in a social network as a node and a relationship as an edge or a link.

While the publisher and social networks collect more and more user data through different types of e-commerce applications, news applications, games, social networks applications, and other mobile applications on different mobile devices, a user may by tagged with different features accordingly. Using these different tagged features, online advertising providers may create more and more audience segments to meet the different targeting goals of different advertisers. Thus, it is desirable for advertisers to directly select the audience segments with the best performances using keywords. Further, it would be desirable to the online advertising providers to provide more efficient services to the advertisers so that the advertisers can select the audience segments without reading through the different features or descriptions of the audience segments.

Figure 1:
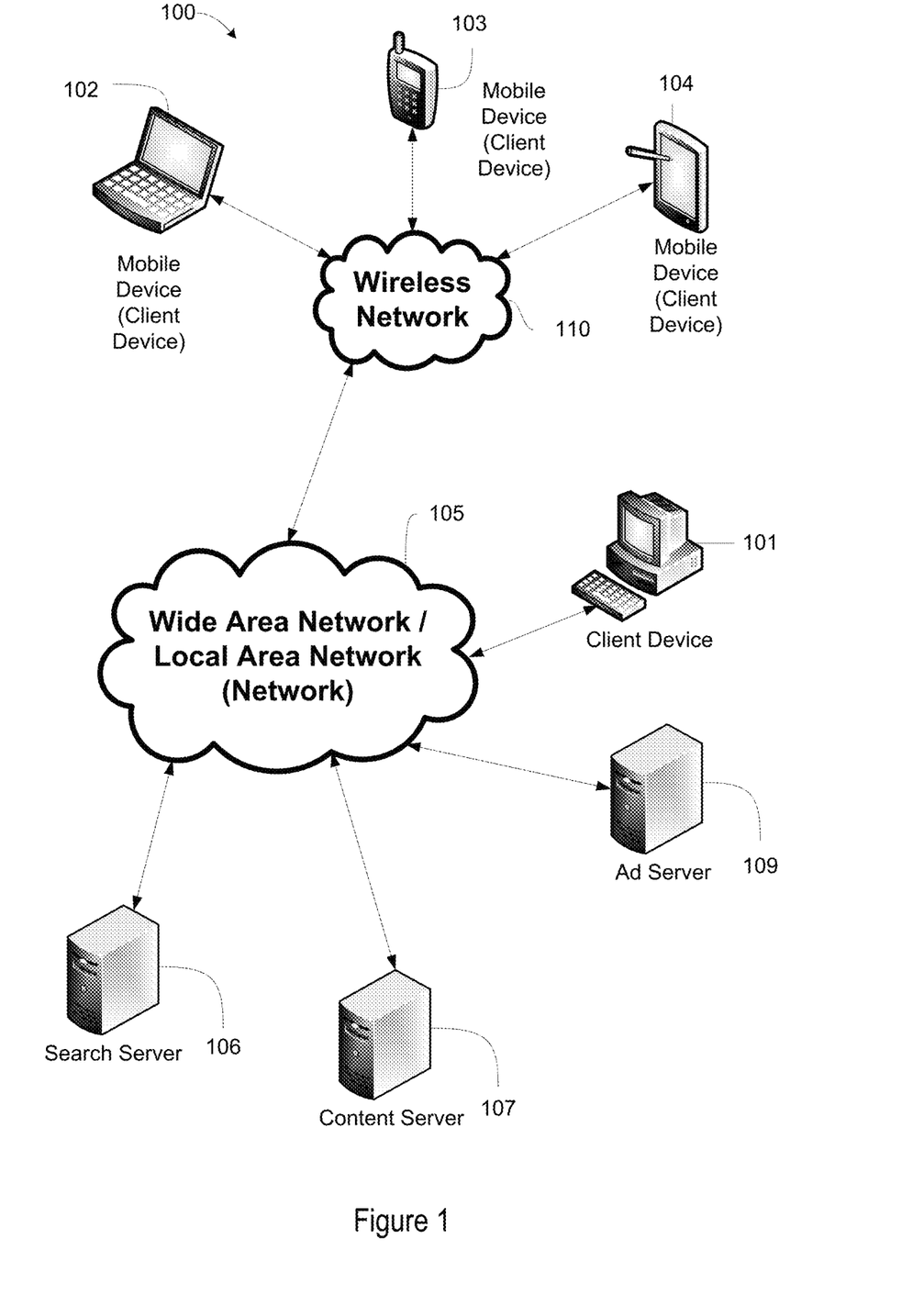
FIG. 1 illustrates a block diagram of an example information system that includes example devices of a network that can communicatively couple with content server.

FIG. 1 is a schematic diagram illustrating an example embodiment of a network. Other embodiments that may vary, for example, in terms of arrangement or in terms of type of components, are also intended to be included within claimed subject matter. As shown, FIG. 1, for example, includes a variety of networks, such as local area network (LAN)/wide area network (WAN) 105 and wireless network 110, a variety of devices, such as client device 101 and mobile devices 102, 103, 104, and a variety of servers, such as search server 106, content server 107, and ad server 109.

The client device 101 may include a computing device capable of sending or receiving signals, such as via a wired or a wireless network. The client 101 device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

The client device 101 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

The client device 101 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

The content server 107 may include a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

The content server 107 may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

A network such as the LAN/WAN 105 and the wireless network 110 may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

The ad server 109 includes a server that stores online advertisements for presentation to users. "Ad serving" refers to methods used to place online advertisements on websites, in applications, or other places where users are more likely to see them, such as during an online session or during computing platform use, for example.

Various monetization techniques or models may be used in connection with sponsored search advertising, including advertising associated with user search queries, or non-sponsored search advertising, including graphical or display advertising. In an auction-type online advertising marketplace, advertisers may bid in connection with placement of advertisements, although other factors may also be included in determining advertisement selection or ranking. Bids may be associated with amounts advertisers pay for certain specified occurrences, such as for placed or clicked-on advertisements, for example. Advertiser payment for online advertising may be divided between parties including one or more publishers or publisher networks, one or more marketplace facilitators or providers, or potentially among other parties.

Some models may include guaranteed delivery advertising, in which advertisers may pay based at least in part on an agreement guaranteeing or providing some measure of assurance that the advertiser will receive a certain agreed upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goal(s). For example, models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example.

A process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers.

For web portals like Yahoo, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

Figure 2:
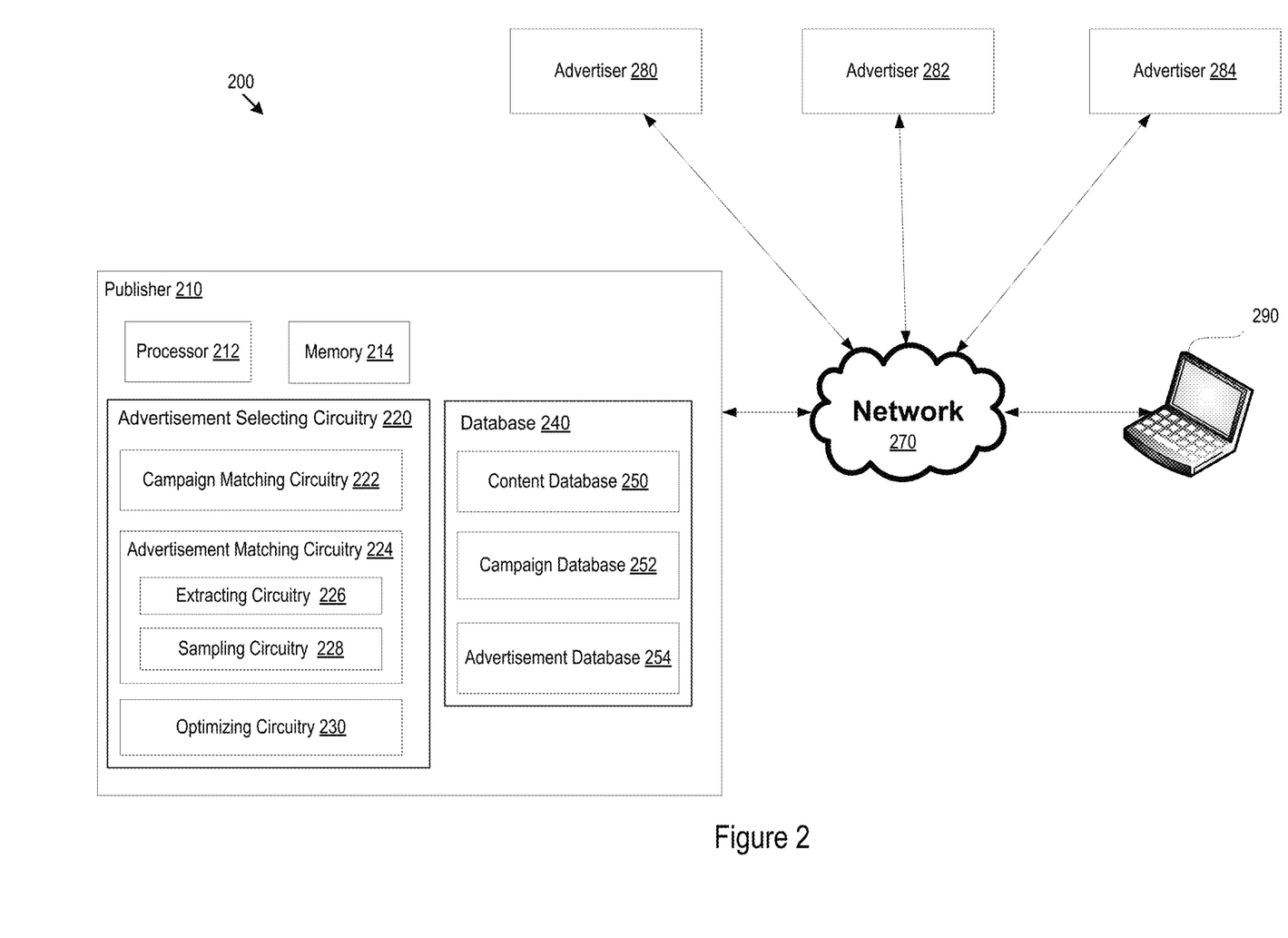
FIG. 2 illustrates a block diagram of an example advertising system that includes an example publisher.

FIG. 2 illustrates a block diagram of an example advertising system that includes an example publisher. The advertising system 200 includes a publisher 210, advertisers 280, 282, and 284, network 270, and a client device 290. The publisher 210 may include a content server such as the content server 107 and an ad server such as the ad server 109 as shown in FIG. 1. Each of the advertisers 280, 282, and 284 may include an ad server such as the ad server 109 in FIG. 1. The publisher 210, the advertisers 280, 282, and 284 and the client device 290 communicate with each other through the network 270. The network 270 may be any network described with reference to FIG. 1.

The publisher 210 includes a processor 212, a memory 214, advertisement selection circuitry 220, and database 240. The advertisement selection circuitry 220 may include campaign matching circuitry 222, advertisement matching circuitry 224, and optimizing circuitry 230. The database 240 may include content database 250, campaign database 252, and advertisement database 254.

The campaign matching circuitry 222 operates to find a relevant advertisement campaign when the publisher 210 finds an opportunity to serve an advertisement on a certain webpage. In one embodiment, the properties of the webpage may be retrieved based on the history of user visits to the webpage, purpose of the webpage, content of the webpage, and other factors. An advertisement campaign may include targeting constraints such as webpage, user age, user gender, user location, user wages, and other attributes. The campaign matching circuitry 222 compares the properties of the webpage and the targeting constraints of campaigns to find an advertisement campaign relevant to the webpage. A set of eligible advertisements may be retrieved based on the targeting constraints of the relevant advertisement campaign. For example, if the targeting constraints of the relevant advertisement campaign are age 18-34, Male, New York City, advertisements related to Yankees games, restaurants in New York City, apartments rent in Manhattan may be retrieved for the relevant advertisement campaign.

The advertisement matching circuitry 224 compares content on a webpage with advertisements stored in the advertisement database 254 and identifies contextually relevant advertisements. The advertisement matching circuitry 224 may include extracting circuitry 226 and sampling circuitry 228.

The extracting circuitry 226 extracts features of content that is to be published or already published on a webpage and advertisements by analyzing them. Specifically, the extracting circuitry 226 may parse metadata of the content, such as title, description, and identify a category/topic of the content based on taxonomy. For example, if content includes metadata of "World Series," the extracting circuitry 226 extracts the metadata and identifies the category of the content as sports or baseball based on the metadata of "World Series." Similarly, the extracting circuitry 226 extracts properties of an advertisement. Specifically, the extracting circuitry 226 may parse the landing page of the advertisement, and identify the category/topic of the advertisement based on the same taxonomy as the content is categorized. Based on the categories of the content and the advertisement, the advertisement matching circuitry 224 calculates a similarity score. The calculated similarity score may be stored in memory 214. The similarity score may be calculated based on how closely related both categories are. For example, if the categories for the content and the advertisement are the same, the similarity score will be highest, such 1 out of 1. If the categories are totally unrelated, the similarity score will be zero or lowest. If the categories are related to some extent, for example, cars and travels, the similarity score can be, for example, somewhere between 0.1 and 0.9.

The sampling circuitry 228 samples video data to obtain sampled frames. Specifically, if the content to be published on a webpage is video content, the sampling circuitry 228 samples the video content using video frame sampling techniques. Similarly, if an advertisement to be selected is a video advertisement, the sampling circuitry 228 also samples the video advertisement using the video frame sampling techniques. Then, the extracting circuitry 226 extracts visual features from the sampled frames of the video content and the video advertisement by utilizing, for example, Deep Convolutional Neural Networks (DCNN).

Inspired by the biological vision, convolutional neural network (CNN), is a sequence of information processing layers over the input images. There are several types of processing layers such as convolutional layers that convolve the input image with a set of filters or pooling layers that collect responses of several units from the previous layer and return maximum or average of them. A Deep CNN (DCNN) is a network that has many of these data processing layers, e.g. more than five. A DCNN may have 8 layers, and for a given image, may output the probability of that image belonging to about 1000 categories.

The visual features will be described in detail with reference to FIG. 4. Based on the extracted visual features from both the video content and the video advertisement, the advertisement matching circuitry 224 calculates another similarity score. The calculated similarity score may be stored in memory 214.

The optimizing circuitry 230 selects an advertisement that minimizes an under-delivery risk in the advertising system 200 when the risk of an under-delivery is present for a guaranteed advertisement campaign. In one embodiment, when there is no significant under-delivery risk observed in the advertising system 200, the optimizing circuitry 230 will select the most contextually relevant advertisement from the set of eligible advertisements that are matched with the relevant advertisement campaign identified by the campaign matching circuitry 222. When there is significant under-delivery risk for the relevant contract, the optimizing circuitry 230 may still try to find a contextually relevant advertisement, and if it is not able to find a contextually relevant advertisement, the optimizing circuitry 230 selects an alternative advertisement such as contextually irrelevant advertisement that minimizes the under-delivery risk.

The content database 250 stores content to be published on webpages. The content may be image data, text data, video data, or other types of data. The campaign database 252 stores campaigns for advertisers such as advertisers 280, 282, and 284. Advertisers 280, 282, and 284 enter into campaign contracts with the publisher 210 to receive placements of their advertisements or messages in impressions. An advertiser may specify desired targeting criteria. For example, an advertiser may enter into a guaranteed advertisement campaign contract with the publisher, and the publisher may agree to place 1,000,000 impressions over fifteen days for US$8,000. The targeting criteria may include age, gender, residence, and other characteristics of users. For example, the targeting criteria may be age 18-30, male, and California.

The advertisement database 254 stores advertisements received from the advertisers 280, 282, and 284. Advertisements may be text advertisements, image advertisements, video advertisements, or other types of advertisements. In one example, the advertisement database 254 may be maintained in each of the advertisers 280, 282, and 284, and the publisher may access the advertisement database through the network 270.

Figure 3:
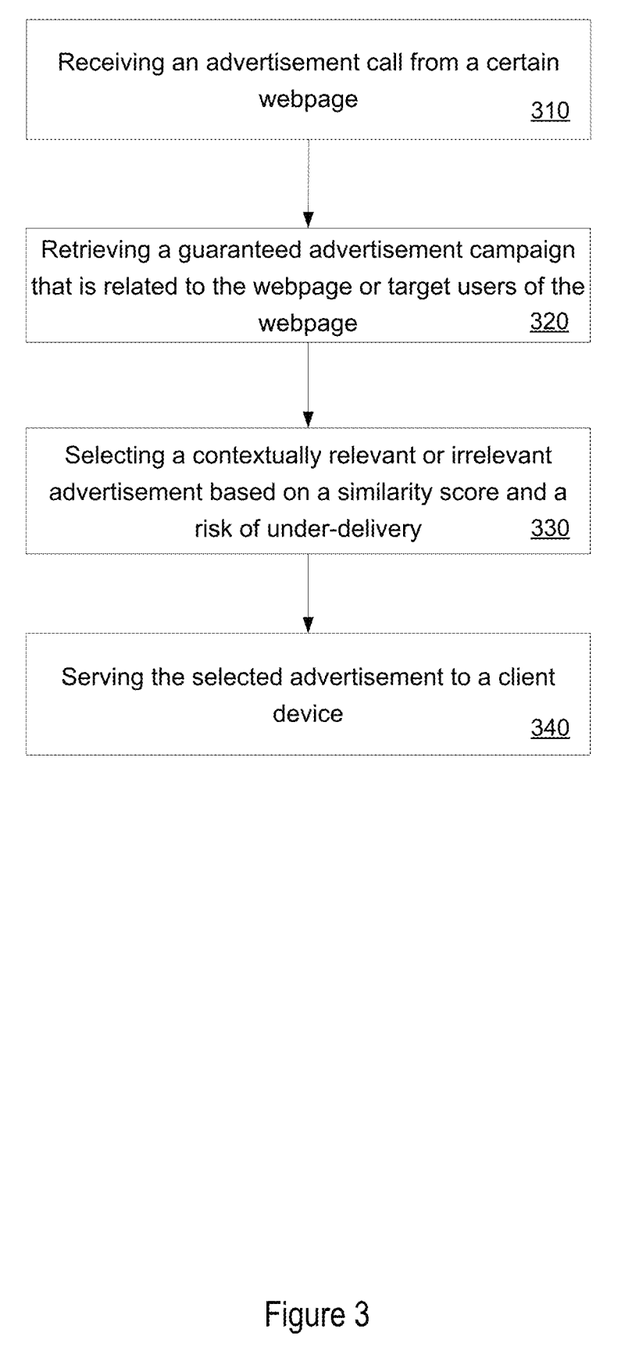
FIG. 3 is an example flow diagram illustrating embodiments of the disclosure.

FIG. 3 is an example flow diagram illustrating embodiments of the disclosure. The advertisement selecting circuitry 220 receives an advertisement call from a certain webpage (310). For example, when an advertisement serving opportunity becomes available at a certain webpage under Yahoo.com, the advertisement selecting circuitry 220 receives the information on the serving opportunity and starts searching for an appropriate advertisement.

Then, the advertisement selecting circuitry 220 retrieves a guaranteed advertisement campaign that is related to the webpage or target users of the webpage (320). For example, if the webpage is a sports news section webpage, a guaranteed advertisement campaign that is related to sports, or a guaranteed advertisement campaign that targets sports fans can be retrieved. The advertisement selecting circuitry 220 then selects a contextually relevant advertisement or contextually irrelevant advertisement based on a similarity score and a risk of under-delivery (330). Contextually relevant advertisements and the similarity score are described in detail below with reference to FIGS. 4-6. The selection of advertisements based on a risk of under-delivery is described in detail below with reference to FIG. 7. Finally, the advertisement selecting circuitry 220 serves the selected advertisement to a client device (340).

Figure 4:
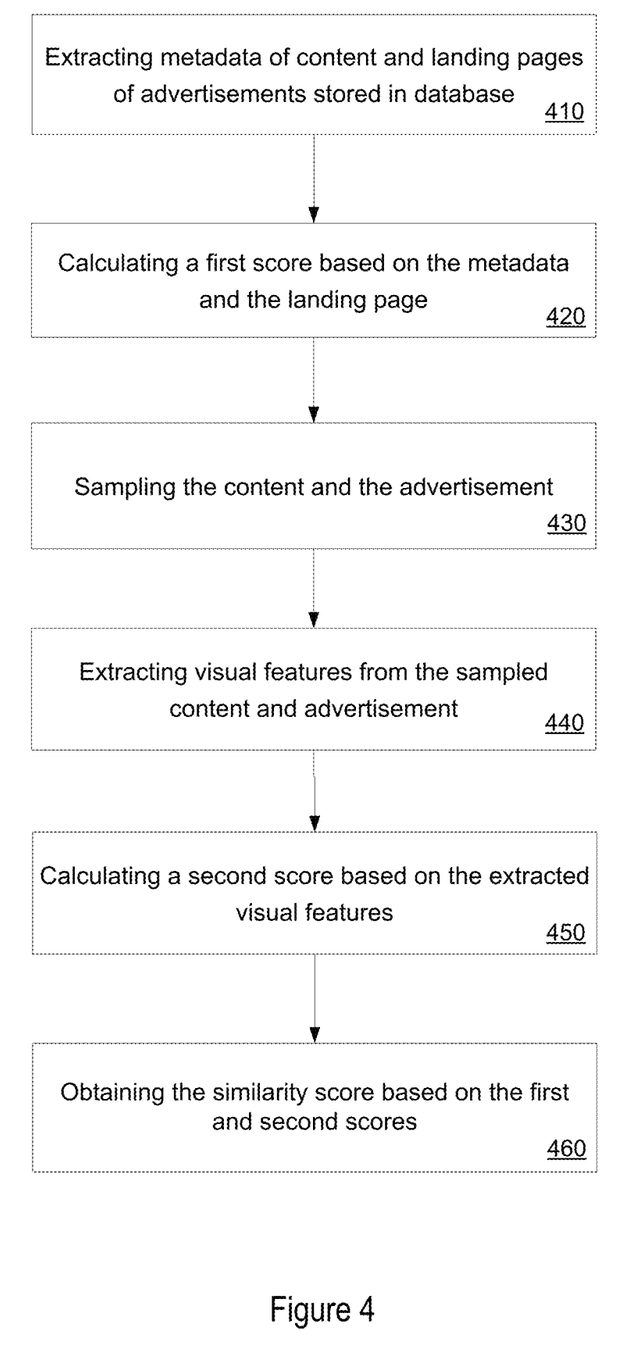
FIG. 4 is an example flow diagram illustrating calculating a similarity score between content and advertisements.

FIG. 4 is an example flow diagram illustrating calculating a similarity score between content and advertisements. The extracting circuitry 226 extracts metadata of content and a landing page of an advertisements stored in the advertisement database 254 (410). For example, the advertisement matching circuitry 224 retrieves one of the content stored in the content database 250, and the extracting circuitry 226 extracts metadata of the content. Also, the advertisement matching circuitry 224 retrieves an advertisement stored in the advertisement database 254, and the extracting circuitry 226 extracts a landing page of the advertisement. As discussed above, the advertisement matching circuitry 224 categorizes the content and the advertisement based on the extracted metadata and landing page. For example, the advertisement matching circuitry 224 may classify the content and the advertisement into one of the predetermined categories.

The advertisement matching circuitry 224 calculates a first score based on the metadata of the content and the landing page of the advertisement (420). For example, the advertisement matching circuitry 224 may compare the identified categories of the content and the advertisement. Then, the sampling circuitry 228 samples the content and the advertisement to obtain sampled frames of the content and the advertisement (430). The sampling circuitry 228 may utilize video frame sampling technologies in sampling the content and the advertisement.

The extracting circuitry 226 extracts visual features from the sampled content and the advertisement (440). The visual feature extraction is based on output of DCNN. This features extraction step may include several strategies. For example, the extraction step provides three features: 1) the last layer output, referred as fc8, that shows probability of about 1000 classes given the input images, 2) name of the classes with significantly large probability values in the last layer output, referred as fc8-KW, that are classes with significant probability given the input image, e.g. cat or dog, and 3) output of one layer before the last layer in DCNN, referred as fc7, that provides a more generic and more abstract representation of the input images.

The advertisement matching circuitry 224, then, calculates a second score based on the extracted visual features (450). For example, if the fc8-KW for the video content is a car, and the fc8-KW for the video advertisement is also a car, the second score will be a high value, such as 1 out of 1. In contrast, if the fc8-KW for the video content is a car, and the fc8-KW for the video advertisement is a flower, the second score will be a low value or zero. If the fc8-KW for the video content is a hotel, and the fc8-KW for the video advertisement is a flight, the second score will be middle, for example, between 0.1 and 0.9 because those two keywords may be related to each other under a topic of travel. Because the present disclosure compares only sampled frames of the content and the advertisement instead of the whole data, the time of compare processing data will be much shortened, especially when processing video data which is generally large in data size. In addition, the similarity between the content and the advertisement can be determined more accurately because the present disclosure compares the content and the advertisement on frame by frame basis.

The advertisement matching circuitry 224 obtains the similarity score based on the first score and the second score (460). For example, the advertisement matching circuitry 224 may use an Ensemble model to obtain the similarity score based on the first and second scores. Ensemble modeling is the process of running two or more related but different analytical models and then synthesizing the results into a single score or spread in order to improve the accuracy of predictive analytics and data mining applications. In other example, the advertisement matching circuitry 224 may obtain the similarity score using a weighted average of the first and second scores.

The advertisement matching circuitry 224 may perform the above whole or part of the process offline, that is, without connecting with the network 270. Also, the advertisement matching circuitry 224 may perform the above whole or part of the process in advance of the event that an opportunity to place an advertisement on a webpage occurs, and thereby shortening the time of retrieving a contextually relevant advertisement.

Figure 5:
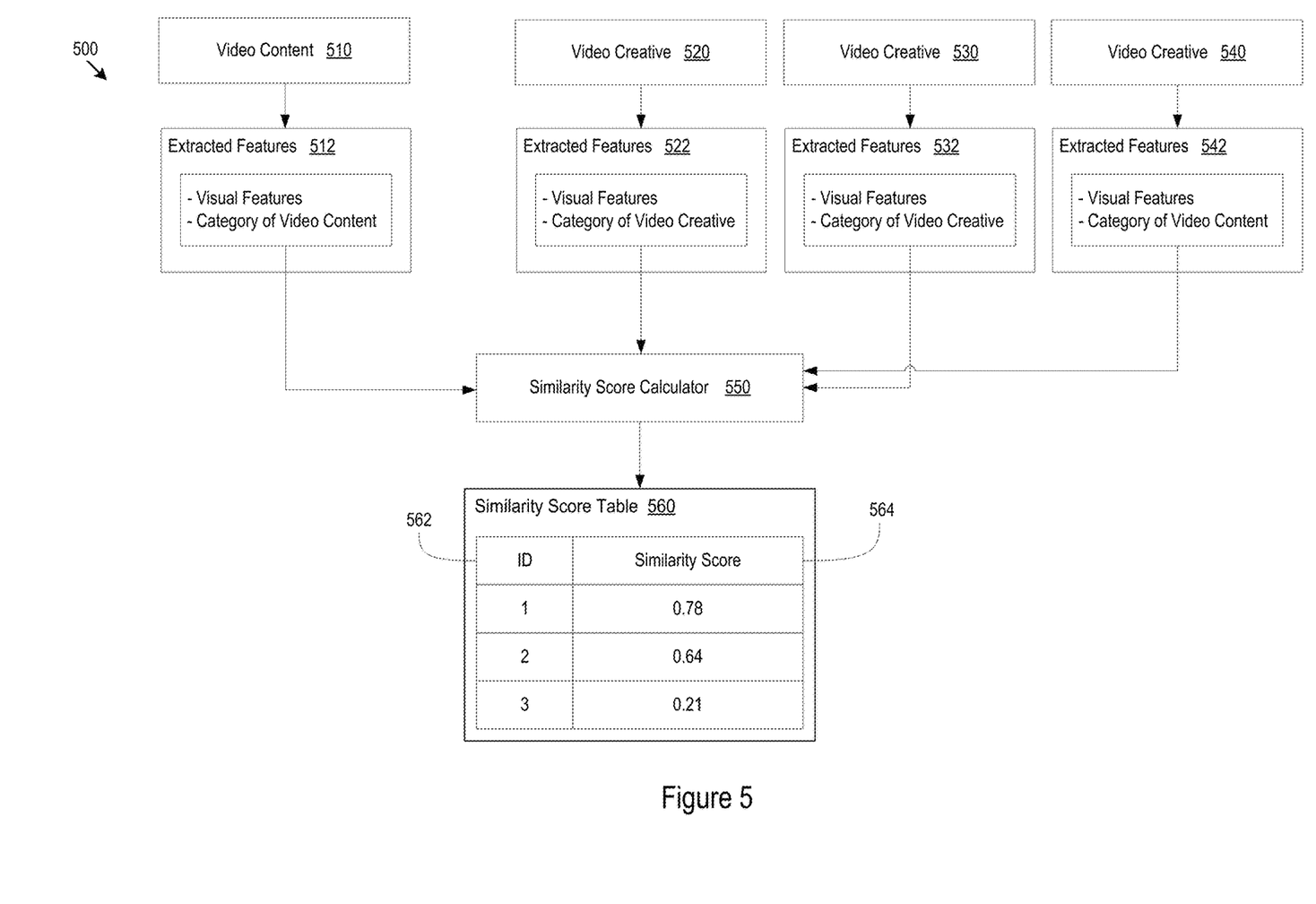
FIG. 5 illustrates a block diagram of an example matching system that includes a similarity score table.

FIG. 5 illustrates a block diagram of an example matching system that includes a similarity score table. The matching system 500 includes video content 510 and video creatives 520, 530, and 540. A video creative is an object that contains data for visually rendering a video advertisement. The video content 510 may be retrieved from the content database 250. In one example, the content that is about to be published on a webpage is selected as the video content 510. For other embodiments, the video content 510 may be selected regardless of whether it is to be published in a short time or not. The video creatives 520, 530, and 540 may be retrieved from the advertisement database 254. In other examples, the video creatives 520, 530, and 540 may be retrieved from advertisement database located in the advertiser's server such as the advertisers 280, 282, and 284 in FIG. 2. Although FIG. 5 illustrates three video creatives, more than three video creatives can be retrieved and compared with the video content 510. For example, all the video creatives stored in the advertisement database 254 may be compared with the video content 510.

As discussed with reference to FIG. 2, the extracting circuitry 226 extracts features from video content 510. The extracted features 512 may include visual features and category of video content. The video content 510 may be sampled by the sampling circuitry 228, and the extracting circuitry 226 may extract visual features from the sampled video frame. For example, visual features may include fc7, fc8, and fc-KW, and the category of the video content 510 may be obtained by parsing and identifying the metadata of the video content 510.

Similarly, the extracting circuitry 226 extracts features from the video creatives 520, 530, and 540. The extracted features 522, 532, and 542 also may include visual features and category of video creative. Similar to the video content 510, the video creatives 520, 530, and 540 may be sampled by the sampling circuitry 228, and the extracting circuitry 226 may extract visual features from the sampled video frame. Visual features may include fc7, fc8, and fc-KW, and the category of the video creatives 520, 530, and 540 may be obtained by parsing and identifying the landing pages of the video creatives 520, 530, and 540.

Then, all the extracted features 512, 522, 532, and 542 are input to a similarity score calculator 550. The similarity score calculator 550 may be included the advertisement matching circuitry 224 in FIG. 2. The similarity score calculator 550 may compare visual features and category between the features of the video content 510 and the features of one of the video creatives 520, 530, and 540. For example, the similarity score calculator 550 may calculate a first score by comparing the categories of the video content 510 and one of the video creatives, and calculate a second score by comparing the visual features such as fc7, fc8, and fc-KW between the video content 510 and one of the video creatives. Then, the similarity score calculator 550 may average the first and second score to obtain a final similarity score. In other embodiments, the similarity score calculator 550 may obtain a final similarity score by using a weighted average of the first and second scores. The similarity score calculator 550 may also obtain a final similarity score by utilizing an ensemble model regarding the visual features and the categories.

The calculated similarity scores are then sent to a similarity score table 560. The similarity score table 560 includes an ID 562 for each of the creatives 520, 530, and 540 and corresponding similarity scores 564. In this example, ID numbers 1, 2, and 3 correspond to the video creatives 520, 530, and 540, respectively. In other example, the ID 562 may be a normalized Uniform Resource Locator (URL) or Universally Unique Identifier (UUID) for the video creatives. The similarity score may be a score ranging between 0 and 1 as shown in the similarity score table. In other embodiments, the range of the similarity score can be varied. For example, the range of similarity score may be 0 to 100. The similarity score table 560 may give the information about which video creatives are eligible to be served for which video content. For example, the video creative 520 is eligible to be served for the video content 510 because the similarity score of the video creative 520 is the highest (0.78) among the three video creatives.

The advertising system may have a threshold similarity score value in determining the eligibility for serving. For example, the threshold similarity score value can be set as 0.5 for the similarity score table 560. Then, both the video creative 520 and the video creative 530 are eligible to be served for the video content 510. In contrast, the video creative 540 is not eligible to be served for the video content 510 because its similarity score is below the threshold value and the video creative 540 may be determined as a contextually irrelevant advertisement or an alternative advertisement.

Figure 6:
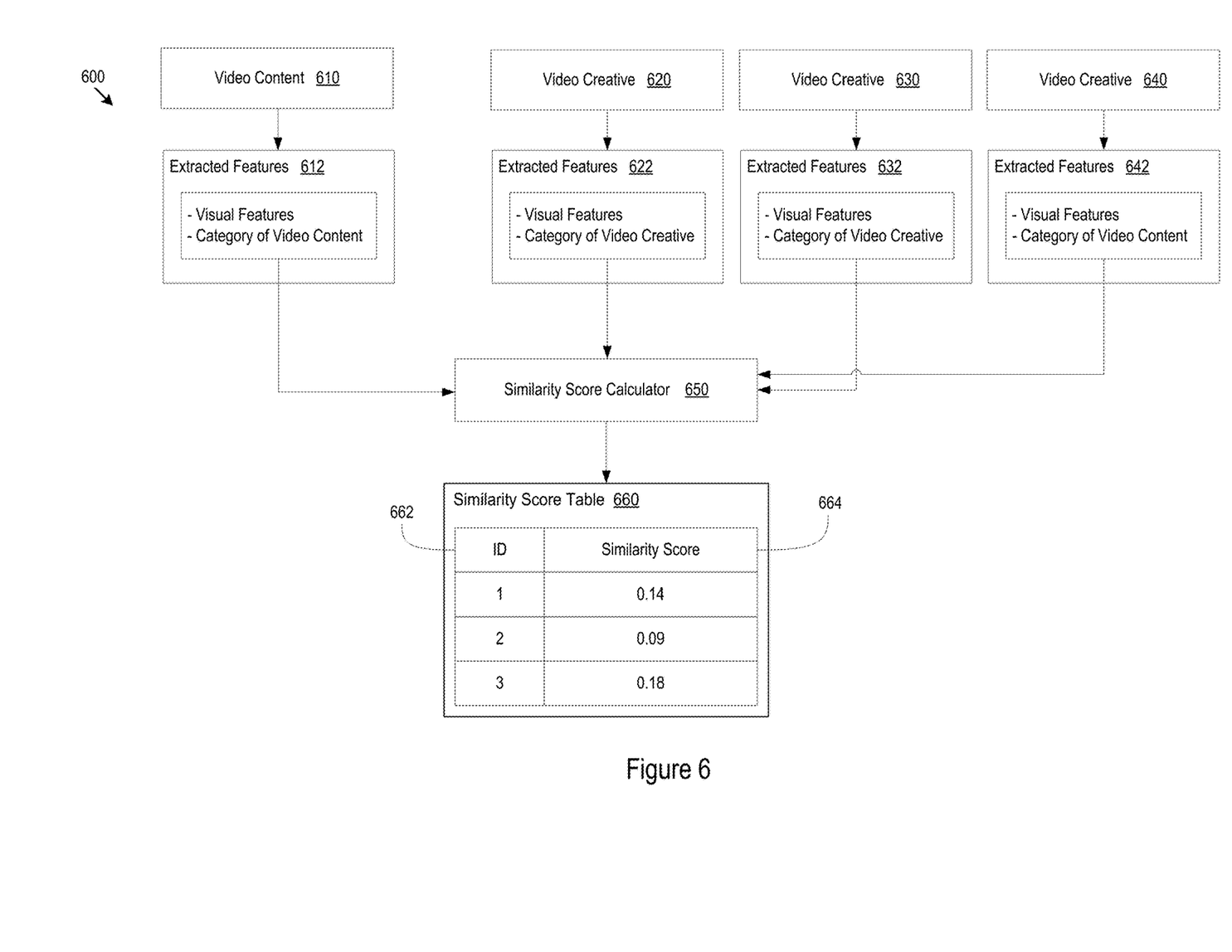
FIG. 6 illustrates a block diagram of an example matching system that includes other similarity score table.

FIG. 6 illustrates a block diagram of an example matching system that includes another embodiment of a similarity score table. Similar to FIG. 5, the example matching system includes a video content 610, and video creatives 620, 630, and 640. Also, similarity scores are calculated and stored in the similarity score table 660. In this embodiment, all the similarity scores for the video creatives 620, 630, and 640 are below a threshold similarity score of, for example, 0.5. Thus, the video creatives 620, 630, and 640 are determined to be contextually irrelevant advertisements, and no contextually relevant advertisements are available for the video content 610.

Figure 7:
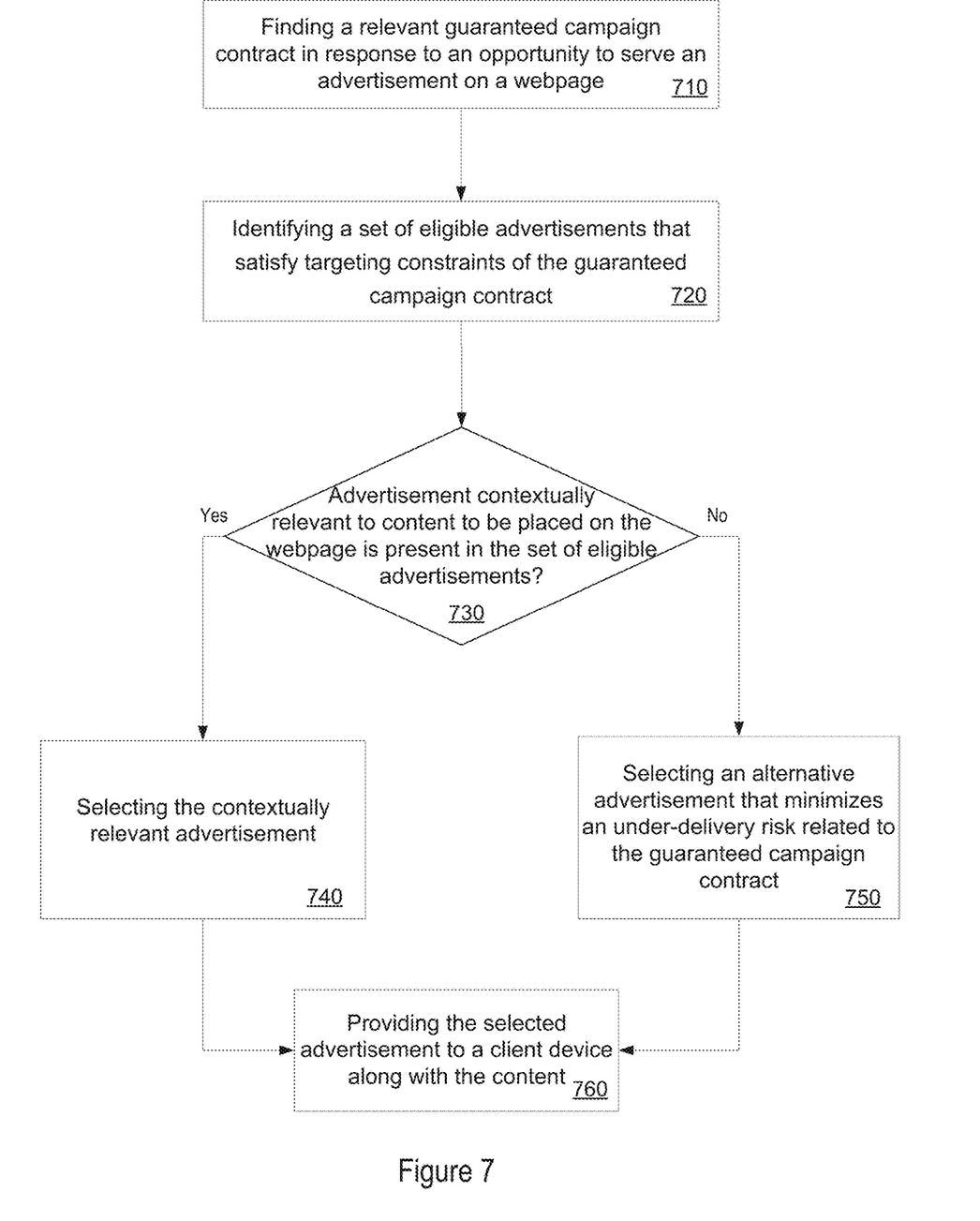
FIG. 7 is an example flow diagram illustrating the optimization of advertisement selections.

FIG. 7 is an example flow diagram illustrating the optimization of advertisement selections. The campaign matching circuitry 222 finds a relevant guaranteed advertisement campaign in response to an opportunity to serve an advertisement on a webpage (710). The guaranteed advertisement campaign may be retrieved from the campaign database 252. The guaranteed advertisement campaign includes targeting constraints such as a webpage, a position on a screen, user age, user gender, location, and other constraints.

The campaign matching circuitry 222 identifies a set of eligible advertisements that satisfy targeting constraints of the guaranteed campaign contract (720). The set of eligible advertisements may be identified from the advertisement database 254. For example, the set of eligible advertisements may be the video creatives 520, 530, and 540 in FIG. 5 or the video creatives 620, 630, and 640 in FIG. 6.

The advertisement matching circuitry 224 determines whether an advertisement contextually relevant to content to be placed on the webpage is present in the set of eligible advertisements (730). For example, the content to be placed on the webpage may be the video content 510 in FIG. 5, and the advertisement matching circuitry 224 determines whether an advertisement contextually relevant to the video content is present in the set of eligible advertisements, such as the video creatives 520, 530, and 540. The contextual relevance may be determined by comparing the similarity scores stored in the similarity score table 560 and a threshold similarity score. For example, the advertisement matching circuitry 224 may find the video creative 520 may be contextually relevant to the video content 510 because its similarity score 0.78 is higher than a threshold similarity score of 0.5.

If an advertisement contextually relevant to the content is present in the set of eligible advertisements, the publisher 210 selects the contextually relevant advertisement (740).

If an advertisement contextually relevant to the content is not present in the set of eligible advertisements, the publisher 210 selects an alternative advertisement that minimizes an under-delivery risk related to the guaranteed campaign contract (750). For example, as shown in FIG. 6, similarity scores for the video creatives 620, 630, and 640 are 0.14, 0.09, and 0.18 respectively, which is less than the threshold similarity score, for example, 0.5. The optimizing circuitry 230 may select one of the contextually irrelevant video creatives and publish it on the webpage in order to minimize the risk of under-delivery of advertisements. Selecting the contextually irrelevant video creative minimizes the risk of under-delivery of advertisements because providing the irrelevant video creative increases the number of advertisement impressions and thereby increases the possibility of meeting the requirements under the guaranteed advertisement campaign. If the publisher 210 decides not to select any advertisement because there is no contextually relevant advertisement, the risk of under-delivery is not reduced. The optimizing circuitry 230 may select the video creative with the highest similarity score, that is, the video creative 640, among the video creatives 620, 630, and 640 in order to improve the effectiveness of video advertisements even though the three video creatives are identified as being contextually irrelevant.

The publisher 210 provides the selected advertisement to a client device along with the content (760). For example, the publisher 210 may publish the video creative 520 close to the video content 510 on the webpage. For other example, the publisher 210 may publish the video creative 640 close to the video content 610 on the webpage. In this regard, instead of forgoing providing an advertisement when no contextually relevant advertisement is found, the publisher 210 may still publish a less contextually relevant advertisement, or a contextually irrelevant advertisement on the webpage along with the content, and thereby minimizing the under-delivery risk of the guaranteed advertisement campaign. Therefore, the publisher 210 is able to provide guarantees for serving video advertisement impressions as recited in the guaranteed campaign contract even when the publisher 210 is not able to find a contextually relevant advertisement from a set of eligible advertisements.

The present disclosure utilizes various information about video content as well as video advertisements to find contextually relevant advertisements. The present disclosure utilizes DCNN to describe the video content and advertisements with visual features such as fc7 and fc8 layer outputs of the Convolutional Neural Network (CNN). Also, the present disclosure identifies categories of the landing page of the video advertisements and metadata of the video content, and matches the video content with the video advertisements based on the identified categories. Because the matching utilizes various information about the content and the advertisements, the present disclosure is able to find an advertisement contextually relevant to the content by utilizing visual features even when the content has no metadata.

In addition, the present disclosure integrates the contextually relevant advertisement serving component in the guaranteed advertisement delivery system using an optimizer. The optimizer maximizes the revenue of overall advertising system by considering contextual relevancy of advertisements to select as well as the risk of campaign under-delivery simultaneously. When there is no significant under-delivery risk observed in the system, the optimizing circuitry selects the most contextually relevant advertisement from the set of eligible advertisements for the user. In contrast, when there is significant under-delivery risk for a campaign, the optimizing circuitry selects a contextually less relevant or contextually-irrelevant advertisement that minimizes the under-delivery risk. Therefore, the present disclosure serves contextually relevant advertisements as many as possible without breaking guarantees under a guaranteed advertisement campaign.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing firmware, software, routines, instructions, etc.

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

What is claimed is:

1. A method for providing advertisements in a guaranteed display advertising system, the method comprising:
    retrieving a guaranteed advertisement campaign related to a webpage available for serving one or more advertisements;
    identifying a set of advertisements relating to the guaranteed advertisement campaign;
    determining whether the set of advertisements includes an advertisement that is contextually relevant to content published at the webpage,
    wherein determining whether the set of advertisements includes an advertisement that is contextually relevant to content published at the webpage comprises:
        extracting metadata and visual features of the content published at the webpage;
        identifying a first advertisement of the set of advertisements, wherein the first advertisement is different than the content published at the webpage;
        extracting a landing page of the first advertisement of the set of advertisements;
        calculating a first score based upon a comparison of the metadata of the content published at the webpage with the landing page of the first advertisement;
        calculating a second score based upon the visual features of the content published at the webpage;
        calculating a similarity score between the first advertisement and the content published at the webpage based upon:
            (i) the first score corresponding to the comparison of the metadata of the content published at the webpage with the landing page of the first advertisement, and
            (ii) the second score corresponding to the visual features of the content published at the webpage and visual features of the first advertisement; and
        determining whether the similarity score is higher than a threshold similarity score;
    responsive to the similarity score not being higher than the threshold similarity score, determining that the set of advertisements does not include the advertisement that is contextually relevant to the content published at the webpage and selecting an alternative advertisement from the set of advertisements that minimizes an under-delivery risk related to the guaranteed advertisement campaign;
    responsive to the similarity score being higher than the threshold similarity score, determining that the set of advertisements includes the advertisement that is contextually relevant to the content published at the webpage and selecting the advertisement that is contextually relevant to the content published at the webpage; and
    providing the alternative advertisement or the advertisement to a client device.

2. The method of claim 1, wherein determining whether the set of advertisements includes an advertisement that is contextually relevant to content published at the webpage comprises:
    responsive to determining that the similarity score is not higher than the threshold similarity score, identifying a second advertisement of the set of advertisements.

3. The method of claim 1, wherein determining whether the set of advertisements includes an advertisement that is contextually relevant to content published at the webpage comprises:
    responsive to determining that the similarity score is higher than the threshold similarity score, determining that the first advertisement is contextually relevant to at least some content published at the webpage, wherein the first advertisement is selected as the advertisement that is contextually relevant.

4. The method of claim 1, wherein the metadata of the content published at the webpage comprises at least one of a title of the content published at the webpage or a description of the content published at the webpage.

5. The method of claim 1, wherein providing the alternative advertisement to the client device minimizes the under-delivery risk by increasing a number of advertisement impressions related to the guaranteed advertisement campaign.

6. A server comprising:
    campaign matching circuitry configured to select a guaranteed advertisement campaign related to a webpage available for serving an advertisement and collect a set of advertisements relating to the guaranteed advertisement campaign;
    advertisement matching circuitry configured to identify one or more contextually relevant advertisements relevant to content to be published at the webpage; and
    optimizing circuitry configured to:
        determine whether the set of advertisements includes a contextually relevant advertisement,
        wherein determining whether the set of advertisements includes a contextually relevant advertisement comprises:

extracting metadata and visual features of the content to be published at the webpage;

identifying a first advertisement of the set of advertisements;

extracting a landing page of the first advertisement of the set of advertisements;

calculating a first score based upon a comparison of the metadata of the content to be published at the webpage with the landing page of the first advertisement;

calculating a second score based upon the visual features of the content to be published at the webpage; and calculating a similarity score between the first advertisement and the content to be published at the webpage based upon:

(i) the first score corresponding to the comparison of the metadata of the content with the landing page of the first advertisement, and (ii) the second score corresponding to the visual features of the content and visual features of the first advertisement;

when the set of advertisements does not include the contextually relevant advertisement, select an alternative advertisement from the set of advertisements that minimizes an under-delivery risk related to the guaranteed advertisement campaign;

when the set of advertisements includes the contextually relevant advertisement, select the contextually relevant advertisement; and provide the alternative advertisement or the contextually relevant advertisement to a client device.

7. The server of claim 6, wherein the content is video content and the set of advertisements comprises video advertisements.

8. The server of claim 6, wherein determining whether the set of advertisements includes a contextually relevant advertisement comprises:

determining whether the similarity score is higher than a threshold similarity score.

9. The server of claim 8, wherein determining whether the set of advertisements includes a contextually relevant advertisement comprises:

responsive to determining that the similarity score is higher than the threshold similarity score, determining that the first advertisement is the contextually relevant advertisement.

10. The server of claim 6, wherein the guaranteed advertisement campaign guarantees delivering a certain number of advertisements.

11. A machine-readable non-transitory storage medium having stored thereon a computer program comprising at least one code section executable by a machine for causing the machine to perform acts of:

retrieving a guaranteed advertisement campaign related to a webpage available for serving an advertisement;

identifying a set of advertisements relating to the guaranteed advertisement campaign;

determining whether the set of advertisements includes an advertisement that is contextually relevant to content published at the webpage, wherein determining whether the set of advertisements includes an advertisement that is contextually relevant to content published at the webpage comprises:

extracting metadata and visual features of the content published at the webpage;

identifying a first advertisement of the set of advertisements;

generating a category based upon analysis of the metadata of the content published at the webpage;

extracting a landing page of the first advertisement of the set of advertisements;

calculating a first score based upon a comparison of the metadata of the content published at the webpage with the landing page of the first advertisement;

calculating a second score based upon the visual features of the content published at the webpage; and calculating a similarity score between the first advertisement and the content published at the webpage based upon the category and:

(i) the first score corresponding to the comparison of the metadata of the content with the landing page of the first advertisement, and (ii) the second score corresponding to the visual features of the content and visual features of the first advertisement;

responsive to determining that one or more similarity scores associated with the set of advertisements, including the similarity score associated with the first advertisement, are not higher than a threshold similarity score, determining that the set of advertisements does not include a contextually relevant advertisement and selecting an alternative advertisement from the set of advertisements that minimizes an under-delivery risk related to the guaranteed advertisement campaign;

responsive to determining that at least one of the one or more similarity scores associated with the set of advertisements is higher than the threshold similarity score, determining that the set of advertisements includes the contextually relevant advertisement and selecting the contextually relevant advertisement; and providing the alternative advertisement or the contextually relevant advertisement to a client device.

12. The machine-readable non-transitory storage medium of claim 11, wherein the contextually relevant advertisement is associated with a second similarity score that is higher than the threshold similarity score.

13. The machine-readable non-transitory storage medium of claim 11, wherein determining whether the set of advertisements includes an advertisement that is contextually relevant to content published at the webpage comprises:

responsive to determining that the similarity score is not higher than the threshold similarity score:

identifying a second advertisement of the set of advertisements;

extracting a second landing page of the second advertisement of the set of advertisements; and calculating a second similarity score by comparing the metadata of the content and the second landing page of the second advertisement.

14. The method of claim 2, comprising:

extracting a second landing page of the second advertisement of the set of advertisements.

15. The method of claim 14, comprising:

calculating a second similarity score by comparing the metadata of the content and the second landing page of the second advertisement.

16. The method of claim 15, comprising:

determining whether the second similarity score is higher than the threshold similarity score.

17. The method of claim 16, comprising:
responsive to the second similarity score being higher than the threshold similarity score, determining that the set of advertisements includes the second advertisement.

18. The method of claim 17, comprising:
providing the second advertisement to one or more client devices.

19. The method of claim 16, comprising:
responsive to the second similarity score not being higher than the threshold similarity score, determining that the set of advertisements does not include the second advertisement.

20. The machine-readable non-transitory storage medium of claim 11, wherein the metadata of the content published at the webpage comprises at least one of a title of the content published at the webpage or a description of the content published at the webpage.

* * * * *